United States Patent
Ryu et al.

(10) Patent No.: US 8,723,970 B2
(45) Date of Patent: May 13, 2014

(54) SYNCHRONIZATION METHOD

(75) Inventors: Jae-kyung Ryu, Suwon-si (KR);
Kwang-young Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 454 days.

(21) Appl. No.: 12/751,525

(22) Filed: Mar. 31, 2010

(65) Prior Publication Data
US 2010/0289951 A1    Nov. 18, 2010

(30) Foreign Application Priority Data
May 12, 2009    (KR) ................. 10-2009-0041360

(51) Int. Cl.
*H04N 5/232*    (2006.01)

(52) U.S. Cl.
USPC ............... 348/211.1; 348/211.99; 348/211.3; 348/211.2

(58) Field of Classification Search
USPC ............ 396/56–59; 709/208; 725/105; 348/14.02, 207.1
See application file for complete search history.

(56) References Cited

U.S. PATENT DOCUMENTS

| | | | |
|---|---|---|---|
| 7,199,820 B2 * | 4/2007 | Oka et al. ................. 348/211.3 |
| 7,298,964 B2 * | 11/2007 | Ishikawa et al. ............ 386/223 |
| 7,480,450 B2 * | 1/2009 | Kobayashi et al. ............ 396/56 |
| 8,082,444 B1 * | 12/2011 | Elliott .......................... 713/171 |
| 2004/0183915 A1 * | 9/2004 | Gotohda et al. .......... 348/207.11 |
| 2006/0001744 A1 * | 1/2006 | Singh ....................... 348/207.99 |
| 2006/0159118 A1 * | 7/2006 | Shvodian et al. ............ 370/449 |
| 2008/0106621 A1 * | 5/2008 | Jung et al. ................... 348/262 |
| 2008/0291283 A1 * | 11/2008 | Achiwa et al. ............. 348/207.2 |
| 2009/0163185 A1 * | 6/2009 | Lim et al. ................... 455/414.1 |

* cited by examiner

*Primary Examiner* — Twyler Haskins
*Assistant Examiner* — Angel L Garces-Rivera
(74) *Attorney, Agent, or Firm* — Drinker Biddle & Reath LLP

(57) ABSTRACT

A synchronization method of a plurality of digital image signal processors when the digital image signal processors are to be operated simultaneously. The synchronization method includes: forming a plurality of digital image signal processors, which are to perform synchronization, into a synchronization group; synchronizing each of the digital image signal processors with the time of an artificial satellite respectively in the plurality of digital image signal processors; transmitting a synchronization message, comprising information of a specific synchronization time for performing synchronization, from an arbitrary digital image signal processor included in the synchronization group to another digital image signal processor included in the synchronization group; and performing synchronization in each of the digital image signal processors at the specific synchronization time based on the synchronization message.

13 Claims, 6 Drawing Sheets

SYNCHRONIZATION METHOD

CROSS-REFERENCE TO RELATED PATENT APPLICATION

This application claims the benefit of Korean Patent Application No. 10-2009-0041360, filed on May 12, 2009, in the Korean Intellectual Property Office, the disclosure of which is incorporated herein in its entirety by reference.

BACKGROUND OF THE INVENTION

1. Field of the Invention

The invention relates to a synchronization method in a plurality of digital image signal processors when the digital image signal processors are to be operated simultaneously.

2. Description of the Related Art

For synchronization in a plurality of digital image signal processors, when an operation command is given from a first device 110 using a wireless communication network, as illustrated in FIG. 1, an operation in response to the operation command is performed in a second device 120. However, in such a synchronization method, a wireless communication network such as wireless local area network (WLAN) or Bluetooth is used to provide the operation command from the first device 110 to the second device 120 and the time taken is about 1 to 3 seconds. Such a time difference T 130 greatly affects an application operation when the application requires a synchronization of a plurality of digital image signal processors.

For example, when the operation command for performing a shutter operation is delivered from the first device 110 to the second device 120, the shutter operation is performed in the second device 120 after about 1 to 3 seconds and thus synchronization is not properly accomplished.

Accordingly, a method of using light and a sensor for sensing light has been proposed. However, the method fails due to the surroundings.

SUMMARY OF THE INVENTION

An embodiment of the invention provides a synchronization method in a plurality of digital image signal processors, which may solve a problem of a time difference.

An embodiment of the invention also provides a synchronization method including transmitting a message, including specific time information, to the digital image signal processors synchronized with the time of an artificial satellite.

According to an embodiment of the invention, there is provided a synchronization method including: forming a plurality of digital image signal processors, which are to perform synchronization, into a synchronization group; synchronizing each of the digital image signal processors with the time of an artificial satellite respectively in the plurality of digital image signal processors; transmitting a synchronization message, comprising information of a specific synchronization time for performing synchronization, from an arbitrary digital image signal processor included in the synchronization group to another digital image signal processor included in the synchronization group; and performing synchronization in each of the digital image signal processors at the specific synchronization time based on the synchronization message.

According to another embodiment of the invention, there is provided a synchronization method including: synchronizing a plurality of digital image signal processors with the time of an artificial satellite through a global positioning system (GPS) installed in each of the plurality of digital image signal processors; setting an arbitrary digital image signal processor from among the plurality of digital image signal processors as a master device and the other digital image signal processors as slave devices and forming synchronization groups; transmitting a synchronization message, comprising information of a specific synchronization time for performing synchronization, from the arbitrary digital image signal processor included in the synchronization group to another digital image signal processor included in the synchronization group; and performing synchronization in each of the digital image signal processors at the specific synchronization time based on the synchronization message.

According to another embodiment of the invention, there is provided digital image signal processor including: a global positioning system (GPS) unit for synchronizing with the time of an artificial satellite; a transmitter/receiver unit for transmitting and receiving a synchronization message comprising information of a specific synchronization time and a specific synchronization operation; and a digital signal processor (DSP) for performing the specific synchronization operation at the specific synchronization time based on the synchronization message.

BRIEF DESCRIPTION OF THE DRAWINGS

The above and other features and advantages will become more apparent from the following detailed description of exemplary embodiments with reference to the attached drawings in which.

DETAILED DESCRIPTION OF EMBODIMENTS OF THE INVENTION

Hereinafter, embodiments of the invention will be described more fully with reference to the accompanying drawings.

The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In addition, the specification and the drawings are not provided to limit the invention; the scope of the invention may be defined by the claims. The terminology used herein is for the purpose of describing exemplary embodiments and thus may be understood to satisfy the technical concept and meaning of the invention.

Figure 1:
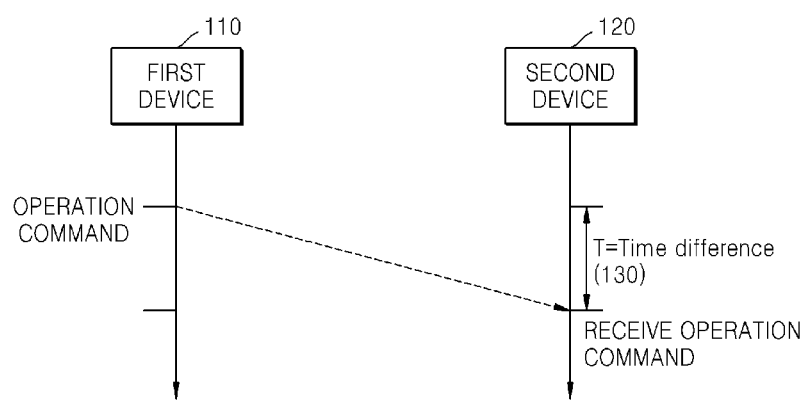
FIG. 1 illustrates a problem of a conventional synchronization method.

FIG. 1 illustrates a problem of a conventional synchronization method.

An operation command is transmitted from a first device 110, which is to be synchronized with a second device 120, to the second device 120. The second device 120 receives the operation command and performs the corresponding operation.

However, in the conventional synchronization method, a time difference T 130 occurs between the time when the operation command was given by the first device 110 and the time when the operation command was received by the second device 120. In general, when a wireless communication network such as wireless local area network (WLAN) or Bluetooth is used, the time difference T 130 is about 1 to 3 seconds. The range of fluctuation in the time difference T 130 is high according to circumstances.

Figure 2:
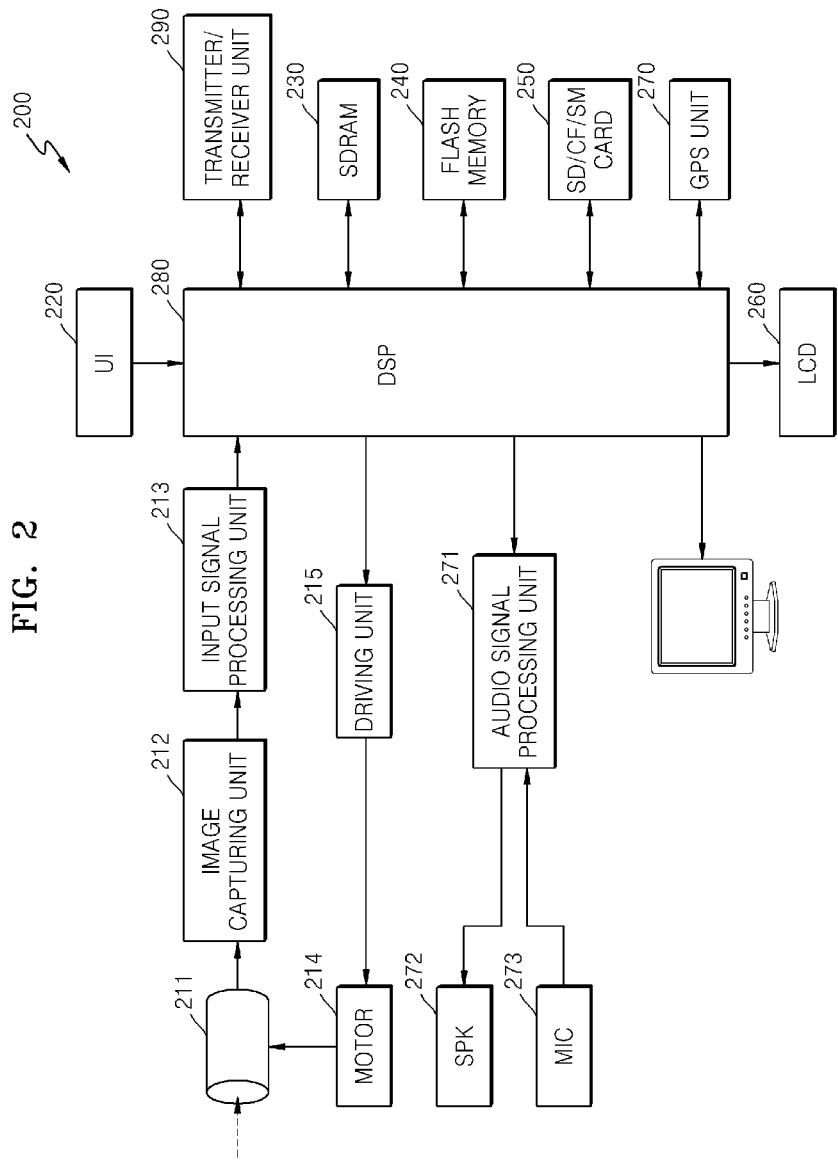
FIG. 2 is a block diagram of a digital camera as an example of a digital image signal processor, according to an embodiment of the invention.

FIG. 2 is a block diagram of a digital camera 200 as an example of a digital image signal processor, according to an embodiment of the invention. The digital image signal processor, according to this embodiment of the invention, may be all devices for processing an image signal, such as digital cameras, hand-held devices, portable multimedia players (PMPs), plasma display panels (PDPs), mobile phones, and camcorders.

The digital camera 200 of FIG. 2 includes a global positioning system (GPS) unit 270 and a transmitter/receiver unit 290. The digital image signal processors, according to the present embodiment, which are to perform synchronization, firstly perform synchronization with the time of an artificial satellite through the GPS unit 270. Then, a message is exchanged with other digital image signal processors that are to be synchronized with the digital image signal processors wirelessly through the transmitter/receiver unit 290 and the digital image signal processors perform synchronization. A synchronization method according to embodiments of the invention will be described in more detail with reference to FIGS. 3 through 6.

Hereinafter, the structure of the digital camera 200, which is an example of the digital image signal processors, according to the present embodiment of the invention, will be described with reference to FIG. 2.

The digital camera 200 includes an optical unit 211, an image capturing unit 212, and an input signal processing unit 213, wherein the optical unit 211 is input an optical signal from a subject, the image capturing unit 212 converts the optical signal input to the optical unit 211 into an electrical signal, and the input signal processing unit 213 performs signal processing such as noise reduction and conversion to a digital signal on the electrical signal provided from the image capturing unit 212. Also, a motor 214 that drives the optical unit 211 and a driving unit 215 that controls the motor 214 are included in the digital camera 200.

In addition, the digital camera 200 may include a user input (UI) unit 220, a synchronous dynamic random access memory (SDRAM) 230, a flash memory 240, and a secure digital (SD)/compact flash (CF)/smart media (SM) card 250, wherein the UI unit 220 inputs an operational signal of a user, the SDRAM 230 temporarily stores data of an input image, data for an arithmetic process, and results of the process, the flash memory 240 stores an algorithm required to drive the digital camera 200 and set data, and the SD/CF/SM card 250, which is a recording device, stores image files.

A liquid crystal display device (LCD) 260 is provided in the digital camera 200. Also, an audio signal processing unit 271, a speaker 272, and a microphone 273 may be included in the digital camera 200, wherein the audio signal processing unit 271 converts sound into a digital signal or a digital signal, which is a sound source, into an analog signal and generates audio files, the speaker 272 outputs sounds, and the microphone 273 inputs sounds. In addition, the camera 200 includes a digital signal processor (DSP) 280 for controlling operation of the digital camera 200.

Each element of the digital camera 200 will now be described in more detail.

The optical unit 211 may include a lens, an aperture, and a shutter, wherein the lens concentrates an optical signal, the aperture controls the quantity of the optical signal (light quantity), and the shutter controls input of the optical signal. The lens includes a zoom lens for controlling narrowing or widening of a viewing angle and a focus lens focusing a subject, each of which is formed of one lens or a plurality of lens groups. A mechanical shutter, which moves a cover up and down, may be included as the shutter. Also, instead of a separate shutter, electrical signal supply may be controlled in the image capturing unit 212, thereby functioning as the shutter.

The motor 214, which drives the optical unit 211, may perform positioning of the lenses, opening/closing of the aperture, and the shutter operation in order to perform auto focusing, automatic exposure adjusting, aperture adjusting, zooming, and focus changing.

The driving unit 215 controls the motor 214 according to a control signal input from the DSP 280.

The image capturing unit 212 receives the optical signal input from the optical unit 211 and forms an image of the subject. The image capturing unit 212 may be a complementary metal-oxide semiconductor (CMOS) sensor array or a charge-coupled device (CCD) sensor array.

The input signal processing unit 213 may further include an analog-to-digital (A/D) converter which converts an analog electrical signal, provided from the CCD of the image capturing unit 212 into a digital signal. Also, the input signal processing unit 213 may further include a circuit for signal processing which controls gain or shapes a waveform with respect to the electrical signal provided from the image capturing unit 212.

The UI unit 220 may include a portion for operating the digital camera 200 or performing various setting operations while capturing. For example, the portion of the UI unit 220 may be realized with buttons, keys, touch panels, touch screens, and/or dials and may be used to input user control signals such as power on/off, capturing start/end, playing start/end/search/operating an optical system, mode change, operating a menu, and operating selection.

The SDRAM 230 may temporarily store RAW data (RGB data) of the image provided from the input signal processing unit 213. Image signal processing may be performed on the temporarily stored RAW data according to an operation of the DSP 280 or the temporarily stored RAW data may be transmitted to other required elements. In addition, data forming an algorithm stored in the flash memory 240 may be converted into executable data and the converted executable data may be temporarily stored in the SDRAM 230. The data stored in the SDRAM 230 is used to arithmetic process in the DSP 280 and an operation according to an algorithm may be performed. Also, the image files stored in the flash memory 240 may be compressed and the converted image data may be temporarily stored in the flash memory 240. The temporarily stored image data is transmitted to the LCD 260 and a predetermined image may be displayed on the LCD 260. Various volatile memories, which temporarily store data while a power source is supplied, may be used as the SDRAM 230, and a semiconductor device, in which a plurality of memory devices is integrated, may be also used as the SDRAM 230.

The flash memory 240 may store an operating system (OS) needed to operate the digital camera 200, application programs, and data for executing the algorithm of a controlling method. Various non-volatile memories such as ROM may be used as the flash memory 240.

Image files generated by compressing the image data provided from the input signal processing unit 213 may be recorded to the SD/CF/SM card 250. A hard disk driver (HDD), an optical disk, an optical magnetic disk, or a hologram memory may be used as the SD/CF/SM card 250.

The LCD 260 may display an image corresponding to the image data provided from the input signal processing unit 213 in real time or may display an image corresponding to the image data restored from the image files stored in the SD/CF/SM card 250. In the present embodiment, the LCD 260 is illustrated by way of example. However, the present embodiment is not limited thereto, and an organic electroluminescence display device or an electrophoretic display device may be employed.

The audio signal processing unit 271 converts a digital signal, which is a sound source, provided from the DSP 280 into sound and amplifies the sound to transmit the amplified sound to the speaker 272 so that the speaker 272 outputs the sound. Also, the audio signal processing unit 271 is input sound through the microphone 273 and the sound is converted into a digital signal and is compressed, thereby generating an audio file. Then, the audio file is transmitted to the DSP 280 and thus an arithmetic operation may be performed.

The DSP 280 may reduce noise with respect to the input image data and may perform image signal processing such as gamma correction, color filter array interpolation, color matrix, color correction, and color enhancement. Also, the DSP 280 may compress the image data generated by performing the image signal processing and generate image files, or may restore the image data from the image files. Image compression may be reversible or non-reversible.

The image data may be converted into a joint photographic experts group (JPEG) or JPEG 2000 format. Also, the DSP 280 may functionally perform processing for unclearness, colors, blur, edge enhancement, image interpretation, image recognition, and image effect. A scene recognition process may be performed with the image recognition. In addition, a display image signal process for displaying on the LCD 260 may be performed in the DSP 280. For example, luminance level adjusting, color correction, contrast adjusting, edge enhancement adjusting, a screen split process, a characteristic image generation and image synthesis may be performed in the DSP 280. The DSP 280 is connected to an external monitor and performs a predetermined image signal processing for displaying on the external monitor. Then, the image data, to which the predetermined image signal processing is performed, may be transmitted to the external monitor so as to display the corresponding image on the external monitor.

The DSP 280 performs the image signal processing described above and may control each element according to the result of the processing. Also, the DSP 280 may control each element according to user control signals input through the UI unit 220. The algorithm for executing the image signal processing is stored in the flash memory 240 and is converted into executable data for the arithmetic process. The executable data may be stored in the SDRAM 230 and the corresponding arithmetic process may be performed in the DSP 280. In addition, the DSP 280 controls to display a scene recognized during a scene recognition mode.

Figure 3:
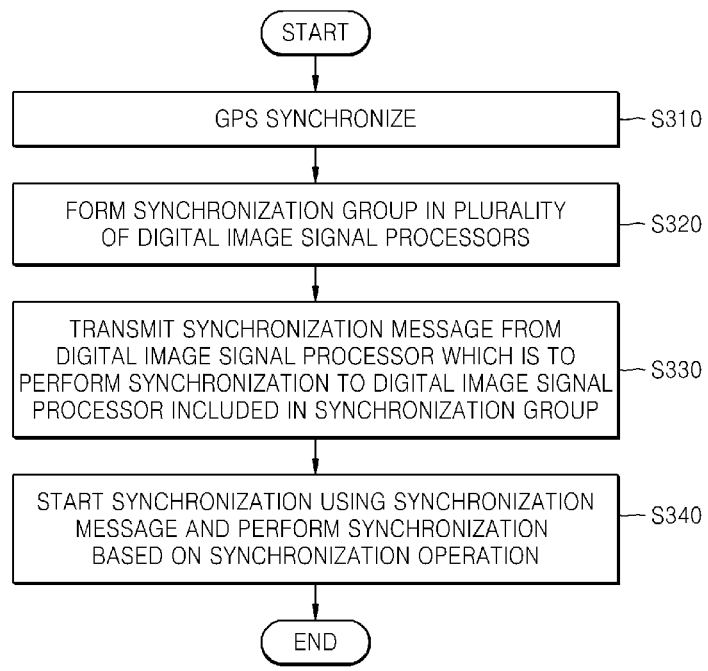
FIG. 3 is a flowchart illustrating a method of synchronization of a plurality of digital image signal processors.

FIG. 3 is a flowchart illustrating a method of synchronization of a plurality of digital image signal processors.

Each of the digital image signal processors, which are to perform synchronization, synchronizes with the time of an artificial satellite through a GPS unit installed to each of the digital image signal processors, in step 310.

Then, a synchronization group is formed between the digital image signal processors which are to perform synchronization, in step 320. A synchronization of digital image signal processors is described with reference to FIG. 4 and forming of the synchronization group by a plurality of digital image signal processors is described with reference to FIG. 6.

Steps 310 and 320 may be sequentially performed or step 310 may be performed after step 320.

Figure 5:
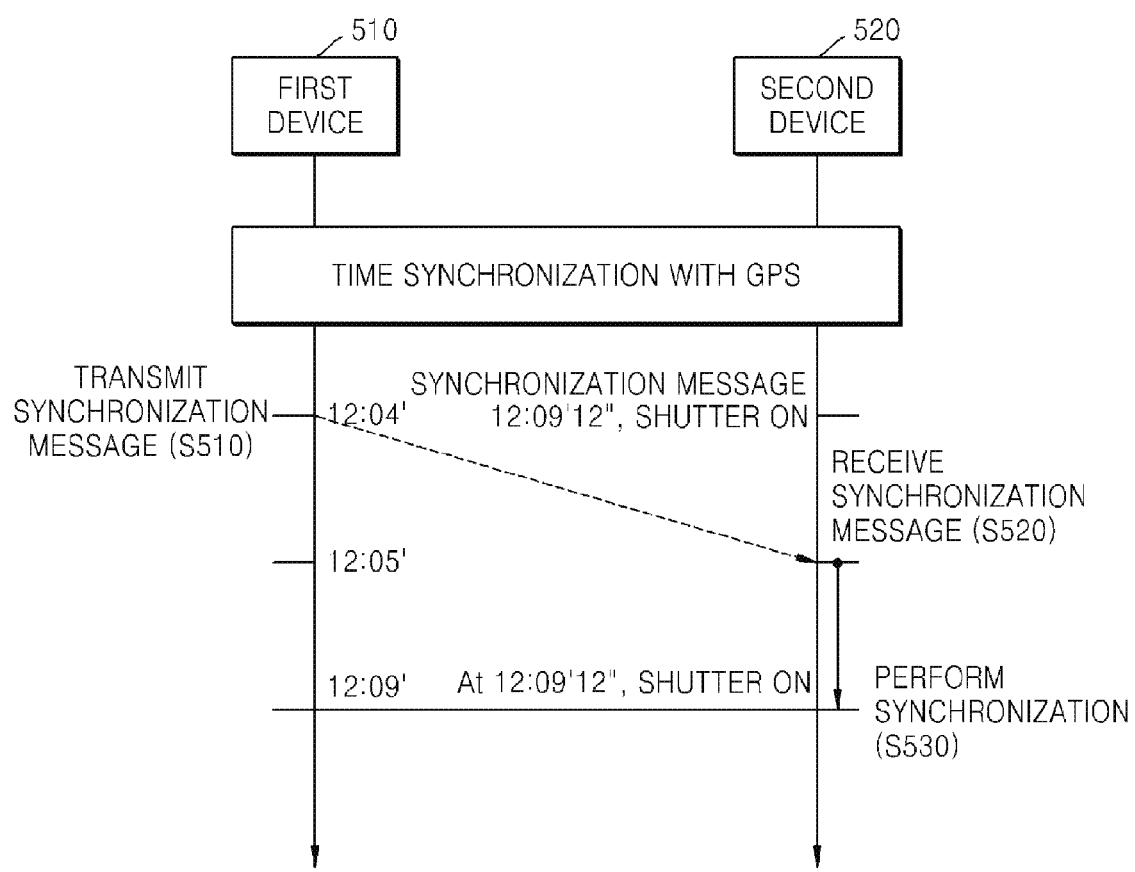
FIG. 5 illustrates a synchronization method using a synchronization message, according to an embodiment of the invention.

When the synchronization group is formed, the digital image signal processor, which is to perform synchronization, transmits a synchronization message to another digital image signal processor included in the synchronization group, in step 330. The synchronization message may include synchronization time information and synchronization operation information. The synchronization time information indicates the time for performing synchronization by the digital image signal processors included in the synchronization group as illustrated in FIG. 5. The synchronization operation may include a shutter operation, a flash operation, various events executable in the digital camera 200 of FIG. 2, and other various events executable in the digital image signal processors.

The digital image signal processors, which receive the synchronization message, included in the synchronization group perform synchronization at a synchronization time based on the synchronization message, in step 340.

Figure 4:
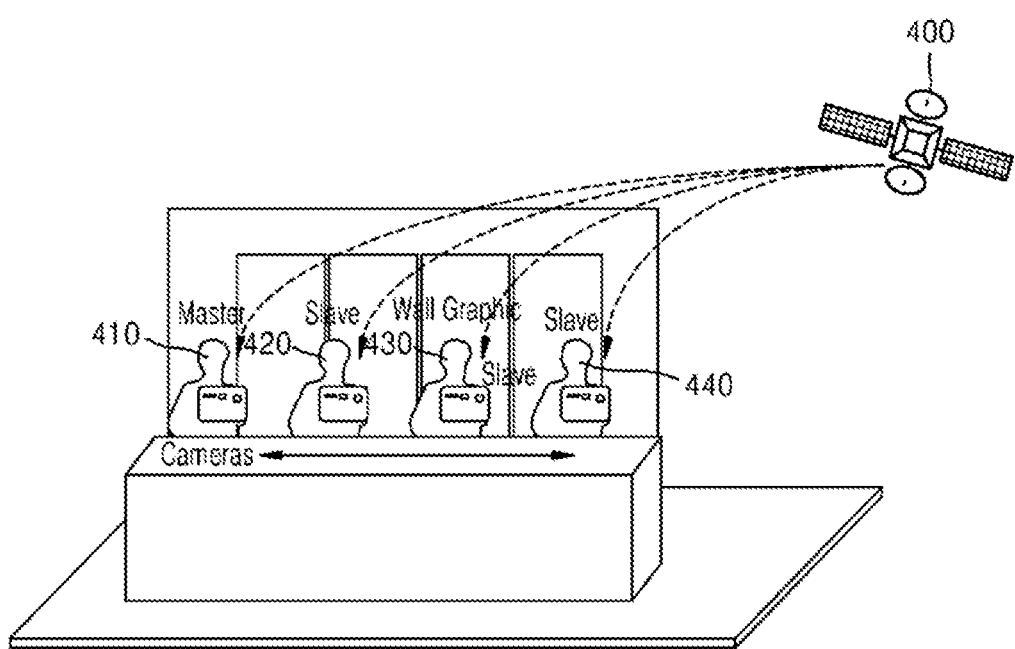
FIG. 4 illustrates performing of synchronization in a plurality of digital image signal processors according to an embodiment of the invention.

FIG. 4 illustrates performing of synchronization in the plurality of digital image signal processors, according to an embodiment of the invention. Digital image signal processors 410, 420, 430, and 440, which are to perform synchronization, respectively synchronize with the time of an artificial satellite 400.

Then, an arbitrary digital image signal processor from among the plurality of digital image signal processors 410, 420, 430, and 440, which are to perform synchronization, is set as a master device 410 and the other digital image signal processors 420, 430, and 440, which are to participate in the synchronization, are set as slave devices, thereby forming the synchronization group. Wireless communication between the master device 410 and the slave devices 420, 430, and 440 is described with reference to FIG. 6.

When the relationship between the master device 410 and the slave devices 420, 430, and 440 is set and the synchronization group is formed, an arbitrary digital image signal processor included in the synchronization group may transmit the synchronization message to another digital image signal processor in the synchronization group.

FIG. 5 illustrates a synchronization method using the synchronization message, according to an embodiment of the invention.

A first device 510, which is the arbitrary digital image signal processor included in the synchronization group as illustrated in FIG. 4, transmits the synchronization message to a second device 520, which is the other digital image signal processor in the synchronization group.

As illustrated in FIG. 5, the first device 510 transmits the synchronization message including the synchronization time (12:09'12") and the synchronization operation (shutter ON) at 12:04', in step 510. The second device 520 receives the synchronization message at 12:05' in step 520. Then, the first device 510 and the second device 520 perform the shutter ON operations at 12:09' and thus are synchronized, in step 530.

Accordingly, the digital image signal processors included in the synchronization group is synchronized with the time of the artificial satellite and perform synchronization at the synchronization time based on the synchronization message. Thus, a problem occurring by the time difference generated due to the synchronization message transmission, in step 510, and the synchronization message reception, in step 520, may be solved.

As another embodiment of the present invention, the synchronization messages transmitted to the digital image signal processors included in the synchronization group may be different to each other. That is, the synchronization message including the synchronization time (12:09'12") and the synchronization operation (shutter ON) may be transmitted to the second device 520 and a synchronization message including the synchronization time (12:10'12") and the synchronization operation (shutter ON) may be transmitted to a third device (not illustrated).

Figure 6:
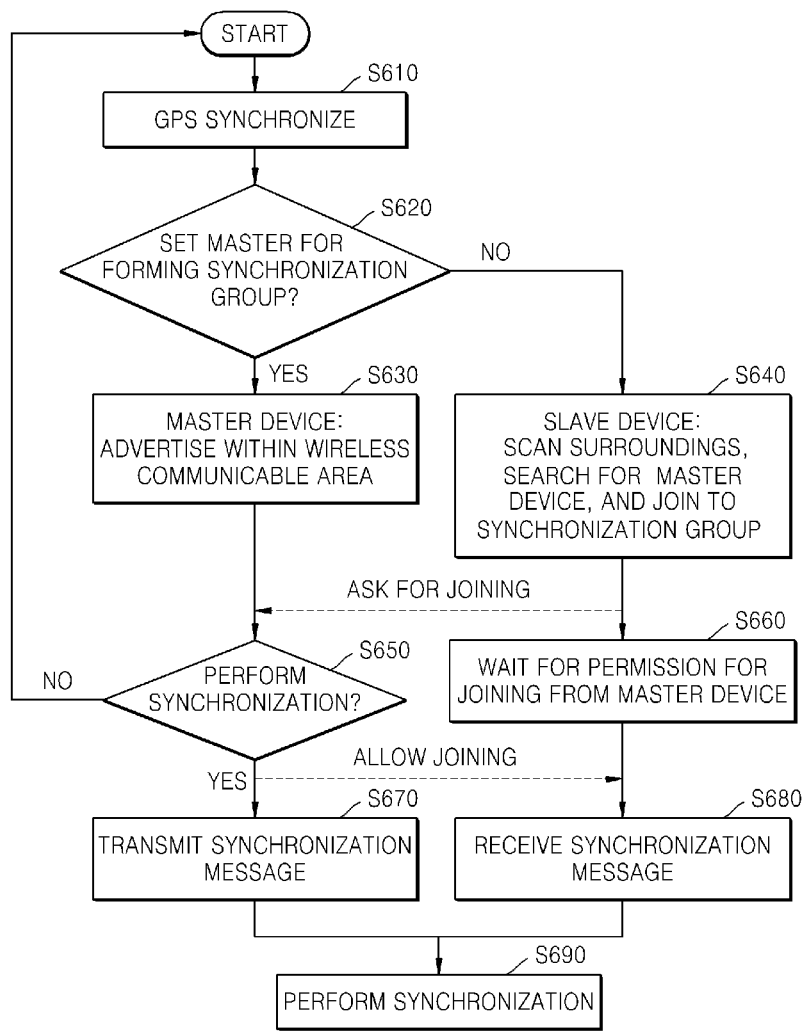
FIG. 6 is a flowchart illustrating a method of forming of synchronization group by a plurality of digital image signal processors.

FIG. 6 is a flowchart illustrating a method of forming of the synchronization group by the plurality of digital image signal processors.

Each of the digital image signal processors, which are to perform synchronization and respectively include a GPS unit, synchronize with the time of an artificial satellite through the GPS unit, in step 610. A master device, which is to perform synchronization, is set from among the plurality of digital image signal processors, in step 620.

The master device transmits a broadcast message, in order to form the synchronization group, and advertises the broadcast message to the surrounding digital image signal processors included in a wireless communicable range. The master device may advertise by transmitting the broadcast message in a wireless communicable area, in step 630.

When a slave device receives the broadcast message and searches for the adjacent master device, the slave device joins the synchronization group, in step 640. The master device determines whether the slave device will perform synchronization with the master device and then allows the slave device to join the synchronization group to form the synchronization group. The master device may separately transmit a unicast message to the slave device to allow the slave device to join the synchronization group.

When the synchronization group is formed, the digital image signal processors included in the synchronization group may transmit the synchronization message regardless of whether one of the digital image signal processors is a master device or a slave device and the other digital image signal processors may receive the synchronization message, in steps 670 and 680. In this case, the synchronization message may be transmitted to the synchronization group as a multicast message. When the synchronization message is transmitted to all digital image signal processors in the synchronization group, synchronization has been performed, in step 690.

According to embodiments of the invention, the time difference generated due to the time taken for communication during synchronization by a plurality of digital image signal processors may be solved. Also, the device performing synchronization may not be affected by the surroundings. Accordingly, malfunctions of the device, which may occur due to the surroundings or the time difference, may be prevented.

An embodiment of the invention may be implemented as computer readable code on a computer readable recording medium. The computer readable recording medium may be any data storage device that can store data which can be thereafter read by a computer system.

When the computer readable code is read and executed by the DSP 280 from the computer readable recording medium, the computer readable code is executed to perform operations of a method of controlling a digital capturing device. The computer readable code may be realized with various programming languages. Also, functional programs, codes, and code segments for accomplishing the present invention can be easily construed by programmers of ordinary skill in the art to which the invention pertains.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While various embodiments of the invention have been shown and described, it will be understood by those of ordinary skill in the art that various changes in form and details may be made therein without departing from the spirit and scope of the invention as defined by the following claims.

What is claimed is:

1. A synchronization method comprising:
   forming a plurality of digital image signal processors, which are configured to perform synchronization, into a synchronization group;
   synchronizing each of the digital image signal processors with the time of an artificial satellite respectively in the plurality of digital image signal processors;
   transmitting a synchronization message from an arbitrary digital image signal processor included in the synchronization group to another digital image signal processor included in the synchronization group, wherein the synchronization message includes an operation command and a synchronization time that specifies the time at which the operation command is to be performed; and
   automatically performing the operation command in each of the digital image signal processors at the synchronization time specified in the synchronization message without receiving a user input signal.

2. The method of claim 1, further comprising respectively synchronizing the plurality of digital image signal processors with the time of the artificial satellite through a global positioning system (GPS) respectively installed in each of the plurality of digital image signal processors.

3. The method of claim 1, further comprising:
   designating an arbitrary digital image signal processor from among the plurality of digital image signal processors comprising the synchronization group as a master device; and
   designating the remaining digital image signal processors as slave devices,
   wherein the synchronization group is formed in a wireless communicable range.

4. The method of claim 3, further comprising:
   advertising a broadcast message by the master device to the slave devices; and
   collecting the synchronization group by the master device.

5. The method of claim 3, further comprising transmitting the synchronization message as a multicast message.

6. The method of claim 1, further comprising transmitting at least one synchronization message that is different from at least one other synchronization message.

7. A synchronization method comprising:
   synchronizing a plurality of digital image signal processors with a time of an artificial satellite through a global positioning system (GPS) installed in each of the plurality of digital image signal processors;
   designating an arbitrary digital image signal processor from among the plurality of digital image signal processors as a master device and designating the remaining digital image signal processors as slave devices to form a synchronization group;

transmitting a synchronization message from an arbitrary digital image signal processor included in the synchronization group to another digital image signal processor included in the synchronization group, wherein the synchronization message includes an operation command and a synchronization time that specifies the time at which the operation command is to be performed; and automatically performing the operation command in each of the digital image signal processors at the synchronization time specified in the synchronization message without receiving a user input signal.

8. The method of claim 7, further comprising transmitting the synchronization message as of a multicast message.

9. The method of claim 7, further comprising:

advertising a broadcast message by the master device to the slave devices; and collecting the synchronization group by the master device.

10. The method of claim 7, further comprising transmitting at least one synchronization that is different from at least one other synchronization message.

11. A digital image signal processor comprising:

a global positioning system (GPS) unit configured to synchronize with a time of an artificial satellite;

a transmitter/receiver unit configured to transmit and receive a synchronization message comprising an operation command and a synchronization time, wherein the synchronization time specifies the time at which the operation command is to be performed; and a digital signal processor (DSP) configured to automatically perform the operation command at the synchronization time specified in the synchronization message without receiving a user input signal.

12. The digital image signal processor of claim 11, wherein the transmitter/receiver unit is further configured to advertise or scan a broadcast message to form a synchronization group.

13. The digital image signal processor of claim 11, wherein the transmitter/receiver unit is further configured to receive the synchronization message through a multicast message.

\* \* \* \* \*